(12) United States Patent
Rossi et al.

(10) Patent No.: US 10,775,570 B2
(45) Date of Patent: Sep. 15, 2020

(54) FIBER OPTIC TERMINUS CONNECTOR

(71) Applicant: COTSWORKS, LLC, Highland Heights, OH (US)

(72) Inventors: Nick Rossi, Cleveland, OH (US); Eugen Artemie, Mayfield Heights, OH (US); Ken Applebaum, Highland Heights, OH (US)

(73) Assignee: COTSWORKS, LLC, Highland Heights, OH (US)

( * ) Notice: Subject to any disclaimer, the term of this patent is extended or adjusted under 35 U.S.C. 154(b) by 0 days.

(21) Appl. No.: 16/171,810

(22) Filed: Oct. 26, 2018

(65) Prior Publication Data

US 2019/0129103 A1  May 2, 2019

Related U.S. Application Data

(60) Provisional application No. 62/577,418, filed on Oct. 26, 2017.

(51) Int. Cl.
*G02B 6/38* (2006.01)

(52) U.S. Cl.
CPC ......... *G02B 6/3893* (2013.01); *G02B 6/3825* (2013.01); *G02B 6/3887* (2013.01); *G02B 6/3898* (2013.01)

(58) Field of Classification Search
CPC .................................................... G02B 6/3898
See application file for complete search history.

(56) References Cited

U.S. PATENT DOCUMENTS

| 7,194,178 | B2 * | 3/2007 | Nakano | G02B 6/3807 |
| | | | | 385/134 |
| 8,641,293 | B2 * | 2/2014 | Lin | G02B 6/3898 |
| | | | | 385/53 |
| 8,873,921 | B2 * | 10/2014 | Lee | G02B 6/3849 |
| | | | | 385/134 |
| 9,417,407 | B2 * | 8/2016 | Walker | G02B 6/389 |
| 9,492,914 | B2 * | 11/2016 | Ng | B25B 9/02 |
| 2005/0213892 | A1 | 9/2005 | Barnes et al. | |
| 2005/0276560 | A1 * | 12/2005 | Reinert | G02B 6/389 |
| | | | | 385/134 |

(Continued)

FOREIGN PATENT DOCUMENTS

WO   WO-2011022728 A1 *  2/2011  ............. G02B 6/387

OTHER PUBLICATIONS

International Search Report and Written Opinion from corresponding International Patent Application No. PCT/US2018/057707, dated Mar. 11, 2019, 14 pages.

*Primary Examiner* — Michelle R Connelly
(74) *Attorney, Agent, or Firm* — Tucker Ellis LLP

(57) ABSTRACT

Provided is a fiber optic connector including a housing sized to fit within a fiber optic receptacle and having a longitudinal passage for receiving a fiber optic terminus, and a deflectable locking member including a base attached to the housing, a deflectable portion having a first end extending from the base and a second end wider than the first end in a first direction orthogonal to the longitudinal passage, and ledges extending downward from the second end of the deflectable portion toward the longitudinal passage for engaging with a wall of the fiber optic receptacle to prevent accidental separation of the housing from the receptacle.

19 Claims, 26 Drawing Sheets

(56) References Cited

U.S. PATENT DOCUMENTS

| | | | |
|---|---|---|---|
| 2006/0171639 A1* | 8/2006 | Dye | G02B 6/3843 |
| | | | 385/78 |
| 2009/0226140 A1 | 9/2009 | Belenkly et al. | |
| 2011/0131801 A1* | 6/2011 | Nelson | H01R 43/26 |
| | | | 29/825 |
| 2011/0286702 A1 | 11/2011 | Nielson et al. | |
| 2013/0114932 A1 | 5/2013 | Horibe et al. | |
| 2014/0357106 A1* | 12/2014 | Varshavsky | H01R 43/26 |
| | | | 439/152 |
| 2018/0210155 A1* | 7/2018 | Goldstein | G02B 6/3879 |

* cited by examiner

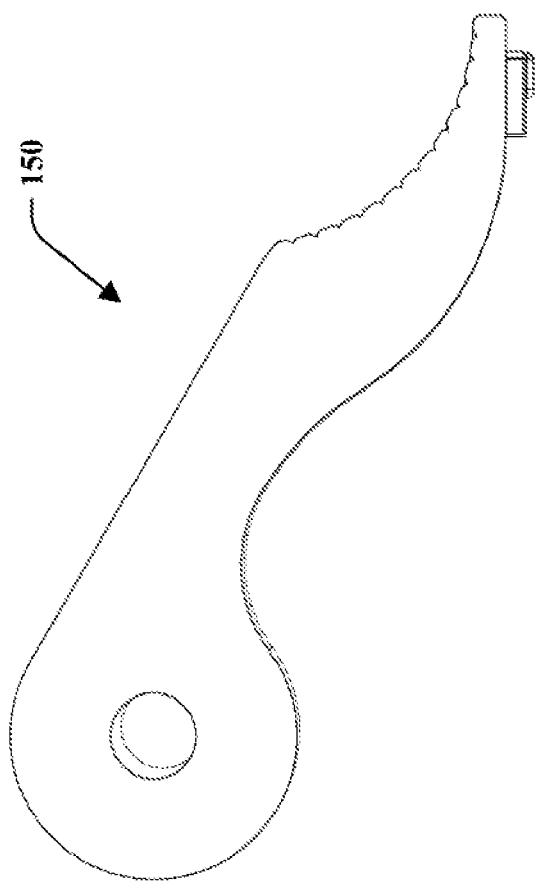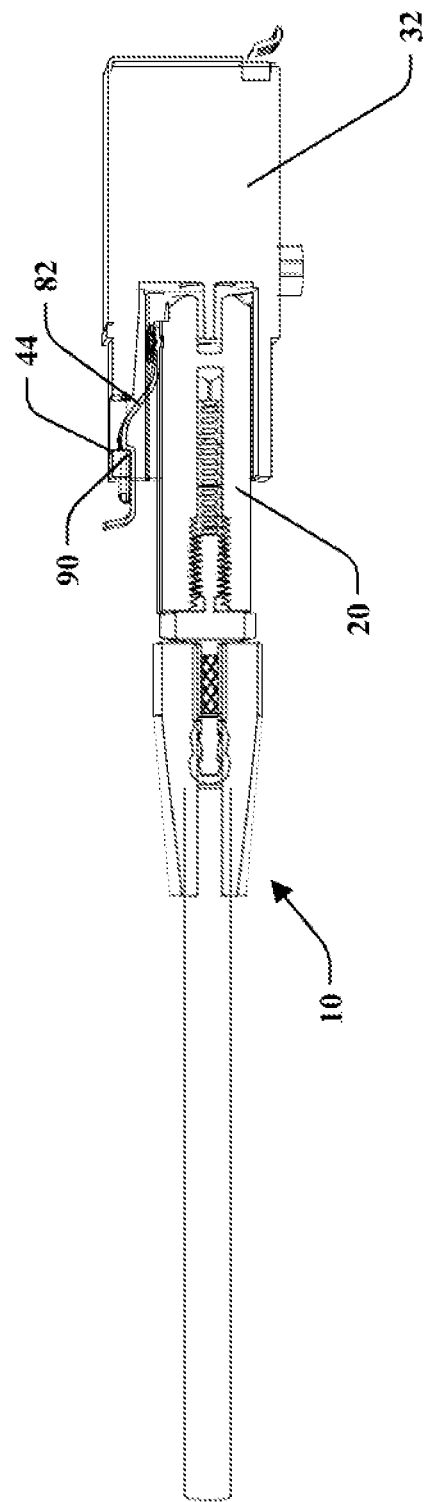
FIG. 8

FIBER OPTIC TERMINUS CONNECTOR

RELATED APPLICATIONS

This application claims the benefit of U.S. Provisional Application No. 62/577,418 filed Oct. 26, 2017, which is hereby incorporated herein by reference.

BACKGROUND

Military, commercial avionics, and industrial networking equipment manufacturers are adopting fiber optic components for various communication applications. An exemplary communication application is to create an operative communication link between a control system and a sensor or other data collection device. The use of fiber optic links are often used to replace existing electrical (e.g., "copper") wiring architectures. Fiber optic links provide higher speed, improved electro-magnetic interference (EMI) performance, lower weight, and increased density. Other advantages of fiber optic links include higher data capacity using multiple light propagation modes. In addition, the fiber optic cable itself is protocol agnostic. Therefore, system upgrades often may be made without replacing the fiber optic cable.

Most fiber optic products are designed for the telecommunications market. But these products are generally not rugged enough to withstand the environmental factors that would adversely affect fiber optic systems in harsh operating environments where excessive vibration, shock, and debris may be present.

A vulnerable point in the fiber optic system is the interface between the fiber optic cable and an active device (e.g., an optical transceiver, an optical transmitter, an optical receiver, or a sensor that interfaces directly with the fiber optic cable). To improve this interface, fiber optic pigtails are commonly used. Pigtailing is generally accomplished by using adhesive to permanently affix the terminal end of the fiber optic cable (or connector therefor) to the active device. Conventional pigtailing raises manufacturing and servicing issues. For instance, after a conventional pigtail is put into place, if something goes wrong with the fiber optic cable, the active device, or electronics interconnected with the active device, then the entire system must be replaced since pigtails relying on adhesive cannot be effectively disconnected.

SUMMARY

To improve the interface between a fiber optic cable and an active device in a fiber optic system, disclosed is a connector that improves on industry standard pluggable interfaces. The result is a rugged connector used to establish a separable interface between a fiber optic cable and a housing for an optical component.

In one embodiment, the disclosed locking connector is compatible with an "LC" receptacle (LC being short for little connector or Lucent connector). The disclosed connector includes metal parts or parts made of another material(s) that are suitable for the environment. The parts form a multi-piece assembly that is interoperable with the existing mechanical features of an LC receptacle that is ordinarily used to interface with a conventional pluggable LC connector.

The separable nature of the disclosed connector allows for serviceability of the fiber optic cable and/or the active device (or associated electronics) during manufacturing and testing, as well as in the field.

In an embodiment a fiber optic connector is provided that includes a housing sized to fit within a fiber optic receptacle and having a longitudinal passage for receiving a fiber optic terminus, and a deflectable locking member including a base attached to the housing, a deflectable portion having a first end extending from the base and a second end wider than the first end in a first direction orthogonal to the longitudinal passage, and ledges extending downward from the second end of the deflectable portion toward the longitudinal passage for engaging with a wall of the fiber optic receptacle to prevent accidental separation of the housing from the receptacle.

In another embodiment, a fiber optic assembly is provided that includes a fiber optic receptacle having a retaining notch with a rearward wall, and a fiber optic connector including a housing sized to fit within the fiber optic receptacle and having a longitudinal passage for receiving a fiber optic terminus, and a deflectable locking member including a base attached to the housing, a deflectable portion having a first end extending from the base and a second end, ledges extending downward from the second end of the deflectable portion toward the longitudinal passage for engaging with the rearward wall, and a planar portion extending axially from the ledges for abutting an underside of a portion of the receptacle.

In still another embodiment, a fiber optic connector is provided that includes a housing sized to fit within a fiber optic receptacle and having a longitudinal passage for receiving a fiber optic terminus, and a deflectable locking member including a base attached to the housing, a deflectable portion having a first end extending from the base and a second end, ledges extending downward from the second end of the deflectable portion toward the longitudinal passage for engaging with a wall of the fiber optic receptacle, and a planar portion extending axially from a bottom of the ledges for abutting an underside of the fiber optic receptacle.

BRIEF DESCRIPTION OF THE DRAWINGS

FIG. 8 is a cross-sectional view of the fiber optic connector engaged with the LC receptacle.

DETAILED DESCRIPTION

A. Definitions

As used herein, the term "fiber optic cable" refers to a cable that includes a buffered or jacketed filament. The filament is typically made of plastic or glass, and light propagates in the filament from one end to the other end, typically for the purpose of data communications.

As used herein, the term "optical transmitter" refers to an active device that converts electrical signals to optical signals, typically with a laser or light emitting diode (LED).

As used herein, the term "optical receiver" refers to an active device that converts optical input signals to electrical output signals.

As used herein, the term "fiber optic transceiver" refers to an active device that functions as both an optical transmitter and an optical receiver.

As used herein, the term "separable" refers to a removable interface that involves the use of one or more tools for insertion and/or extraction. Typically, a separable interface involves a male component that is inserted, at least in part, into a female component.

As used herein, the term "pigtail" refers to an interface of a passive fiber optic cable to an active optical component (e.g., an optical transmitter or an optical receiver), such as with a non-removable adhesive.

B. Separable Locking Fiber Optic Connector

Figure 1:
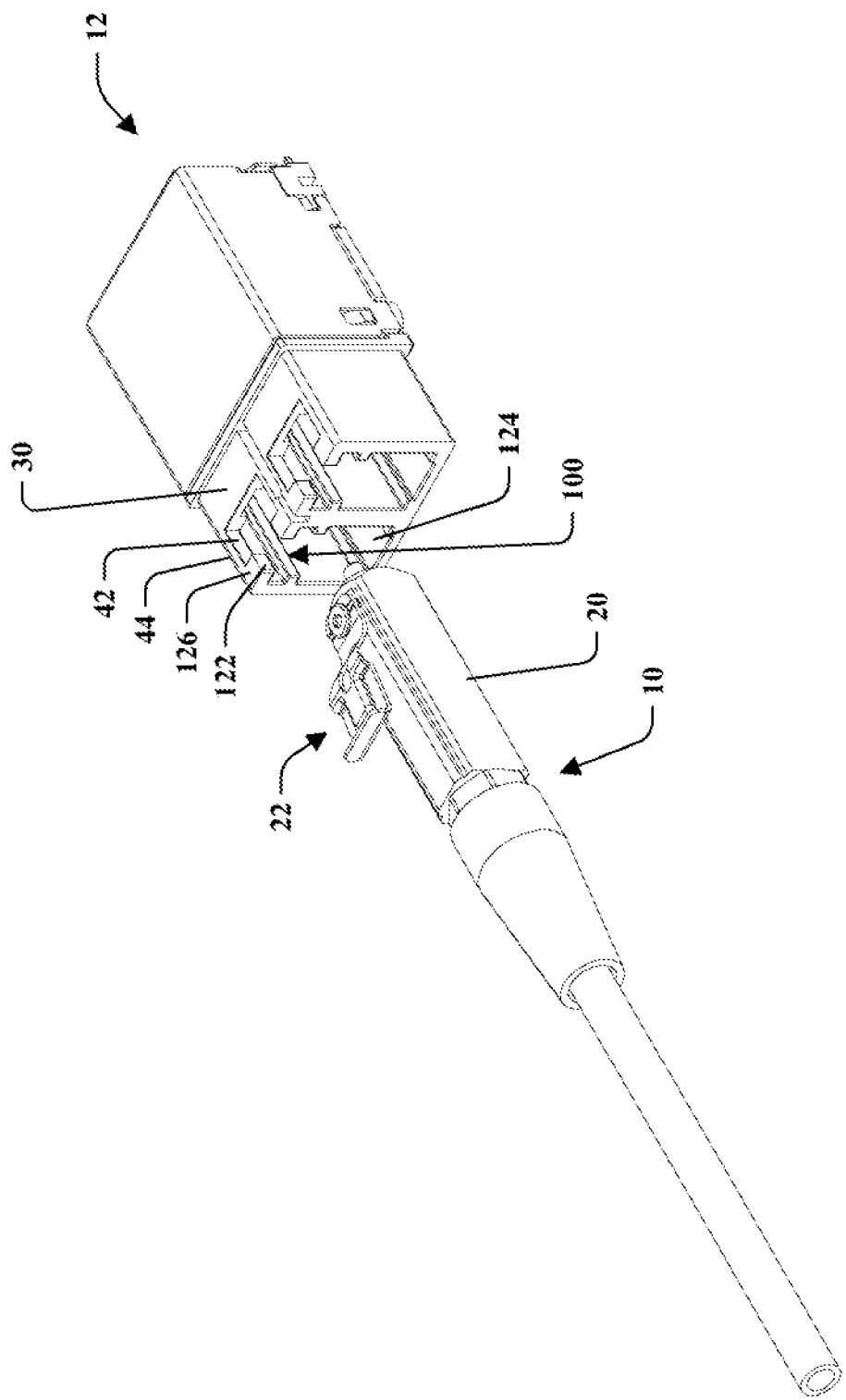
FIG. 1 a perspective view of a fiber optic connector and LC receptacle.
Figure 2:
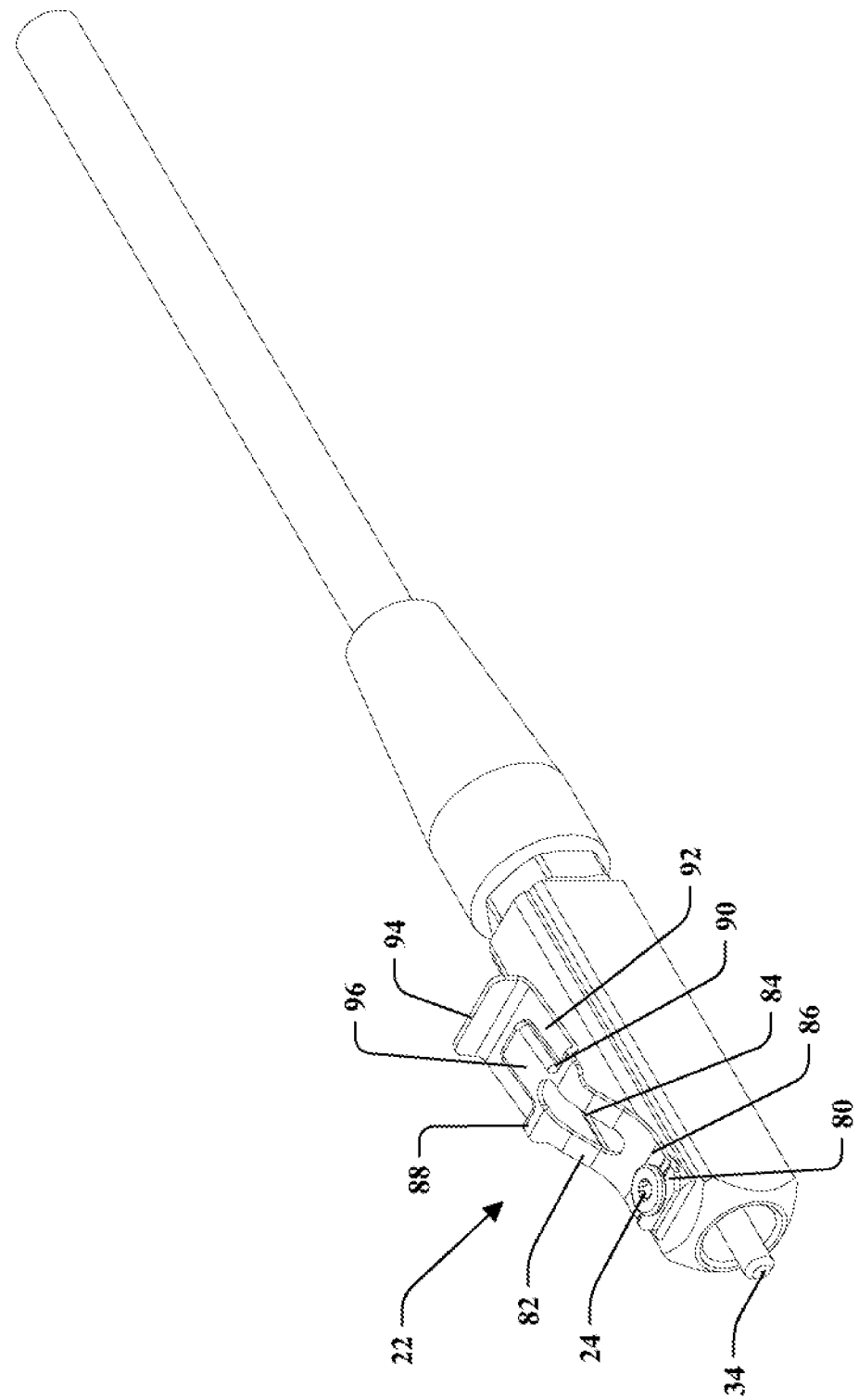
FIG. 2 is a perspective view of the fiber optic connector.
Figure 3:
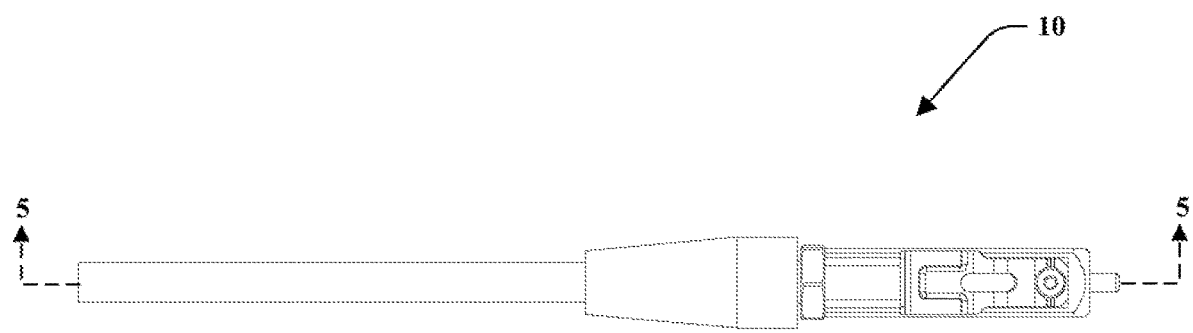
FIG. 3 a top view of the fiber optic connector.
Figure 4:
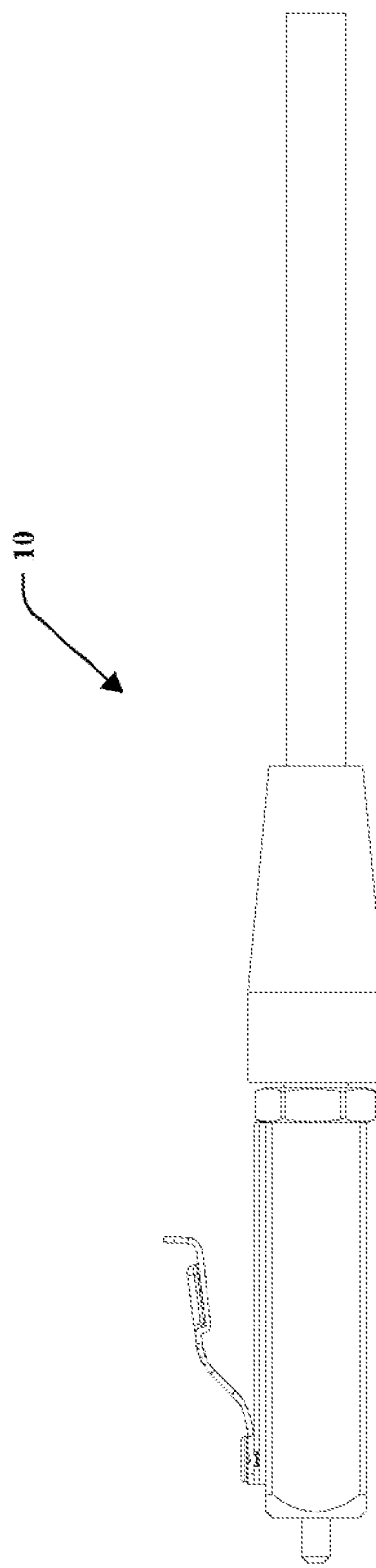
FIG. 4 is a side view of the fiber optic connector.

Referring to FIGS. 1 and 2, a representative embodiment of a separable locking fiber optic connector 10 and an LC receptacle 12 are shown. The figures are not necessarily to scale. Features that are described and/or illustrated with respect to one embodiment may be used in the same way or in a similar way in one or more other embodiments and/or in combination with or instead of the features of the other embodiments.

The fiber optic connector 10 includes one or more of the following components: a connector body 20 (also referred to herein as a housing), a deflectable locking member 22 (also referred to as a locking member), and a securing member 24 (e.g., a fastener that is represented by a screw in the illustrated embodiments.

It will be understood to those of ordinary skill in the art that some artisans use the term "connector" for the terminal end connecting assembly of a fiber optic cable and other artisans use the term "terminus" for the same or similar connecting assembly. This largely depends on the application (e.g., artisans in telecommunications typically use the term connector and artisans in the military and avionics fields typically use the term terminus). For purposes of this document, the term connector and terminus have the same meaning. The fiber optic connector 10 is a terminal end connecting assembly for a fiber optic cable and is, therefore, considered a terminus (also referred to as a connector).

The connector 10 is sized and shaped to coordinate with and fit into the geometry of the LC receptacle 12. For instance, in the illustrated embodiment, the housing is generally rectangular in cross-section. The receptacle shown includes two areas for receiving connectors although it will be appreciated that the receptacle can have any suitable number of receiving areas for receiving corresponding connectors. The connector 10 may be considered a male component of a separable interface and the receptacle 12 may be considered a female component of the separable interface. The receptacle 12 is defined by a housing 30 for an optical component 32 (shown in FIG. 7). As will be discussed in detail below, a ferrule 34 of a fiber optic terminus 36 held by the connector 10 interfaces with the optical component 32. The optical component 32 may be an active device as described above or a passive optical element (e.g., another fiber optic cable or an optical coupler). The housing 20 is radially stable in the receptacle 12 so as to have little or no movement relative to the receptacle 12 in directions transverse (e.g., orthogonal to) a longitudinal axis of the housing 20 (e.g., the housing 20 has little or no movement relative to the receptacle 12 in the lateral and vertical directions relative to the receptacle 12). The housing 20 is also rotationally stable in the receptacle 12 so as to have little or no rotational movement relative to the receptacle 12. "Little" movement refers to movement that is less than an amount that would cause disruption to the operation of the optical system, even during extreme mechanical stresses such as vibrations and shocks experienced in manufacturing systems, military or commercial aircraft (planes and helicopters), watercraft or land vehicles, or similar environments.

In some embodiments, such as but not limited to when the receptacle 12 is an LC receptacle, the receptacle 12 includes a retaining notch 100 in the housing 30, such as a "T" shaped notch. The "T" shaped retaining notch 100 includes a leg 122 formed by radially inwardly extending portions 126 of the housing and a rectangular head chamber 42 that is wider than the leg 122. The leg 122 spaces the head chamber 42 apart from an opening 124 of the receptacle 12 into which the housing 20 fits. A rearward boundary wall 44 of the head chamber 42 proximal the leg 122 may be considered a shoulder against which the locking member 22 engages.

Figure 5:
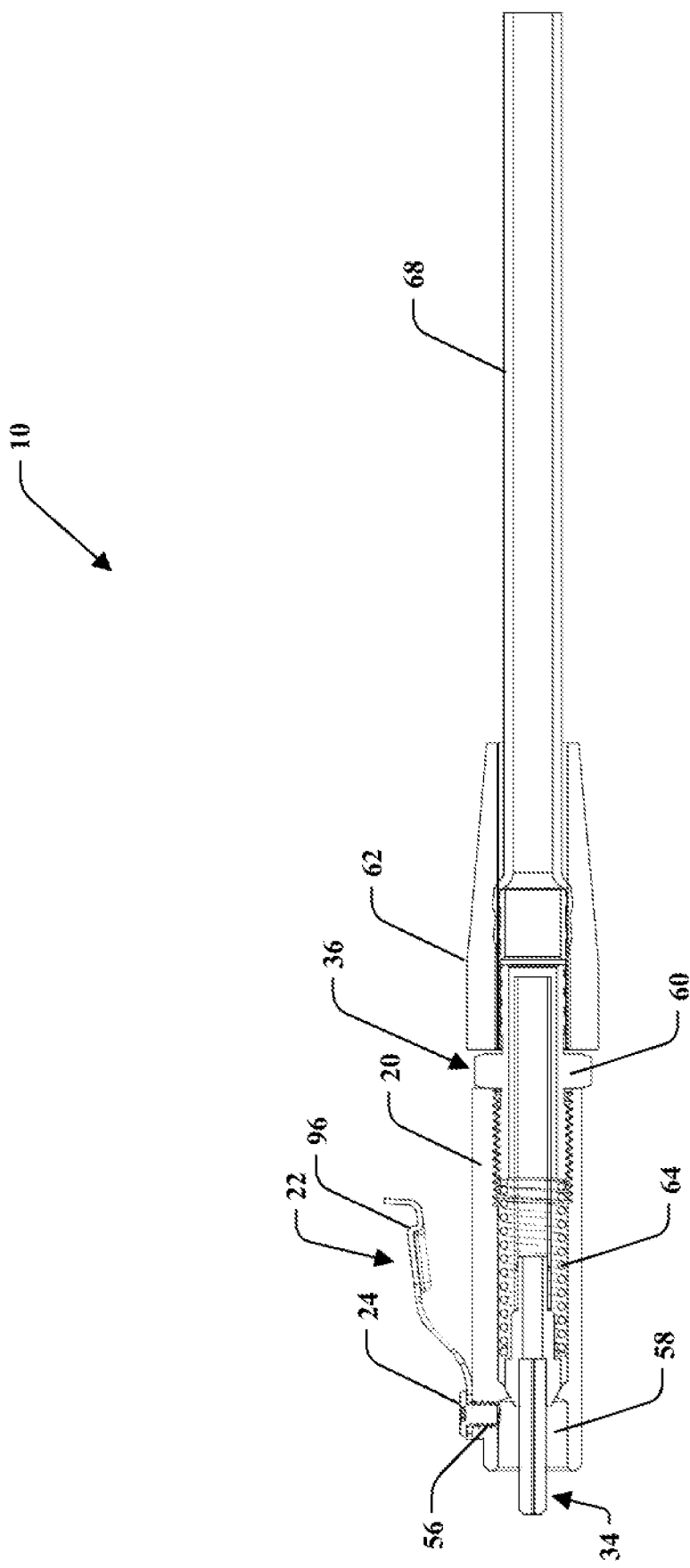
FIG. 5 is a cross-sectional view taken about line 5-5 in FIG. 3.
Figure 6:
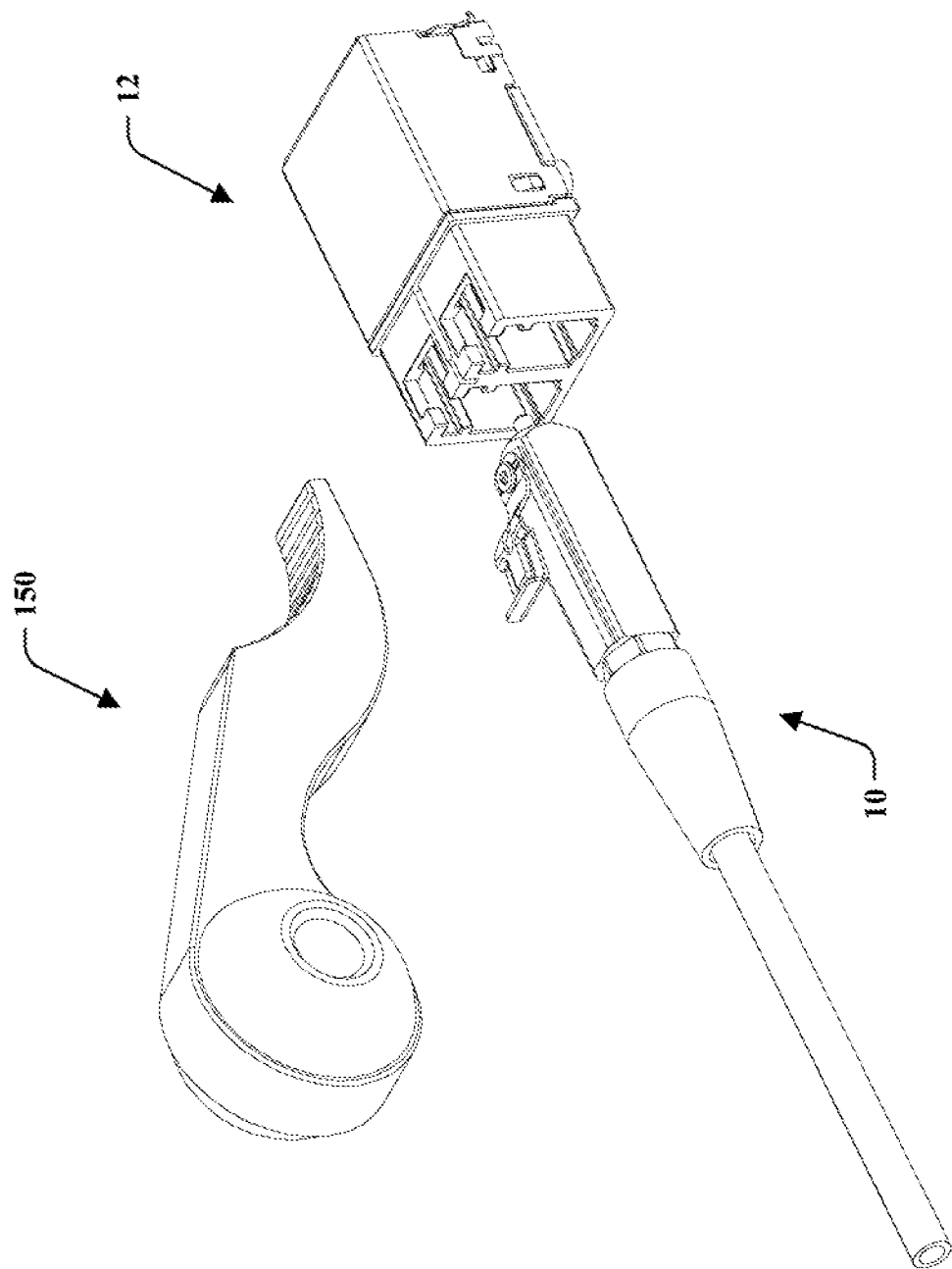
FIG. 6 is a perspective view of the fiber optic connector, LC receptacle and removal tool.

The securing member 24 secures the locking member 22 to the housing 20. Each of the securing member 24, the locking member 22 and the housing 20 are separate components that are assembled to establish the interface between the connector 10 and the receptacle 12. The securing member 24, in one embodiment, is in the form of a fastener that secures the locking member 22 to the housing 20. The securing member 24 may be, for example, a threaded fastener that engages the coordinating threaded opening 56 (FIG. 5) in the housing 20. In other embodiments, the locking member 22 includes a securing member 24 that is press fit into a coordinating receiving opening in the housing 20 to secure the locking member 22 to the housing 20, riveted, welded, swaged, etc.

The locking member 22 includes a base 80 having an opening that aligns with the opening 56 in the housing to receive the securing member 24. Extending from the base 80 is a deflectable portion 82 that is curved and includes an optional slot 84 for engaging with a removal tool. The deflectable portion 82 has a first end 86 extending from the base 80 and a second end 88 wider than the first end 86 in a lateral direction. The deflectable portion 82 is designed to deflect adjacent the base 80 near the first end 86 to allow for removal of the connector 10. Extending downward from the second end 88 of the deflectable portion are ledges 90 that engage with respective portions of the rearward boundary wall 44 to prevent removal of the connector 10 in the axial direction and provide stability so that the connector has no or little rearward movement relative to the receptacle 12.

Extending axially from the bottom of the ledges 90 is a planar portion 92 that abuts an underside of the portions 126 to prevent upward movement of the locking member 22 when installed in the receptacle 12.

The locking member 22 also includes an optional flange 94 extending upward from a back of the planar portion 92 substantially orthogonal to the planar portion 92 to provide an area for a user to engage during intentional removal of the connector 10 without the use of a tool, and a raised portion 96 extending upward from the planar portion 92 and rearward of the second end 88 of the deflectable portion 82 for strengthening the locking member 22. The locking member may be made of a suitable deflectable material that will return to its original shape, such as hardened stainless steel, copper, or beryllium. The housing 20 can be made of similar materials. The locking member has a shorter length that aids in retention and ruggedness, aids in the locking member deflecting adjacent the base 80, and provides a self-reinforcing fit that tightens the harder the cable is pulled. The locking member thereby prevents accidental removal Referring now to FIG. 5, the fiber optic terminus 36 may include one or more of the following components: a ferrule 34, a fitting 60, a strain relief boot 62, a spring 64, and a fiber optic cable 68. The ferrule 34 is disposed in a longitudinal passage 58 in the housing 20 and has a portion extending out of the body for interfacing with the optical component 32. The ferrule 34 is urged in a forward direction by the spring 64, which is seated against the ferrule 34 and the fitting 60. The forward direction refers to a direction along the longitudinal axis of the fiber optic cable 68 and toward the optical component 32. The fitting 60 includes a threaded portion that mates with a corresponding threaded portion in the passage 58, and a knurled portion surrounded by the fiber optic cable 68, which in turn is surrounded by the strain relief boot 62.

Turning now to FIGS. 6-18, an exemplary assembly and disassembly process for the connector 10 and LC receptacle 12 is shown.

Figure 7:
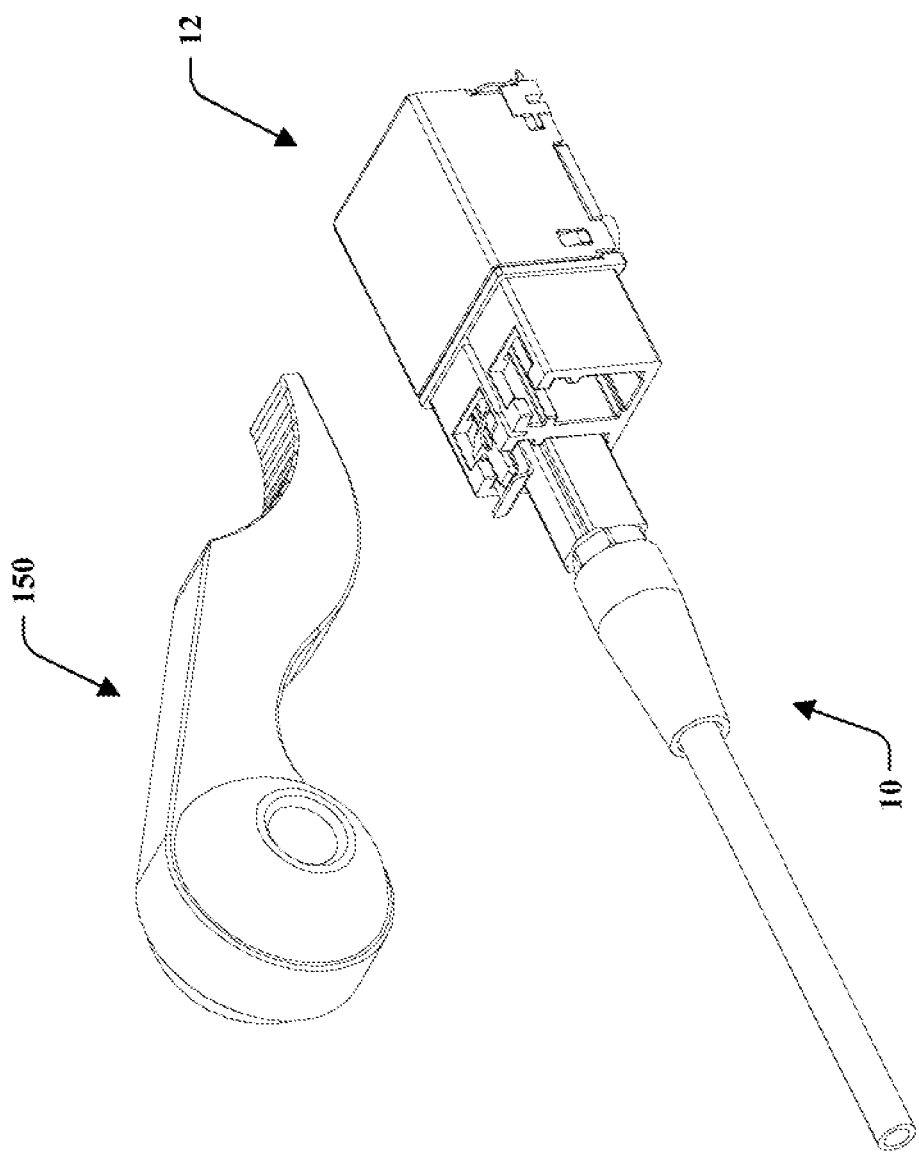
FIG. 7 is a perspective view of the fiber optic connector engaged with the LC receptacle.

FIGS. 7 and 8 show the connector 10 in an engaged position engaged with the LC receptacle. To engage the connector 10, the housing 20 is advanced into the housing 30. As the housing 20 is advanced in the forward direction, the deflectable portion 82 contacts the portions 126 of the receptacle 12 and is deflected towards the housing 20. The housing 20 is advanced further until the deflectable portion 82 passes the leg and deflects upward into the head chamber 42 where the ledges 90 engage with the shoulder 44 shown in FIG. 8. The fiber optic terminus 36 is thereby interfaced with the optical component 32 in the receptacle 12.

Figure 9:
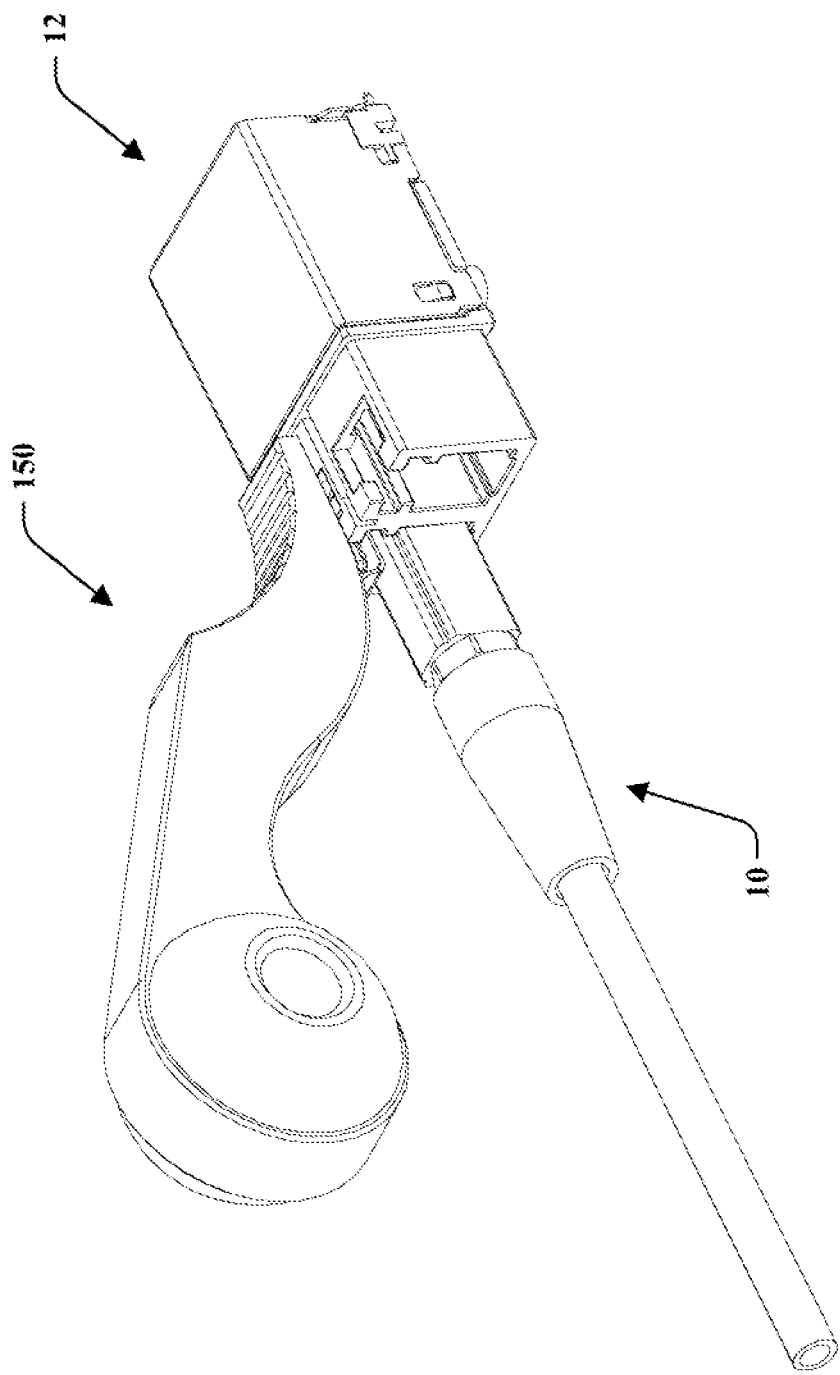
FIGS. 9 and 10 show a removal tool contacting a locking member of the connector when engaged with the LC receptacle.
Figure 10:
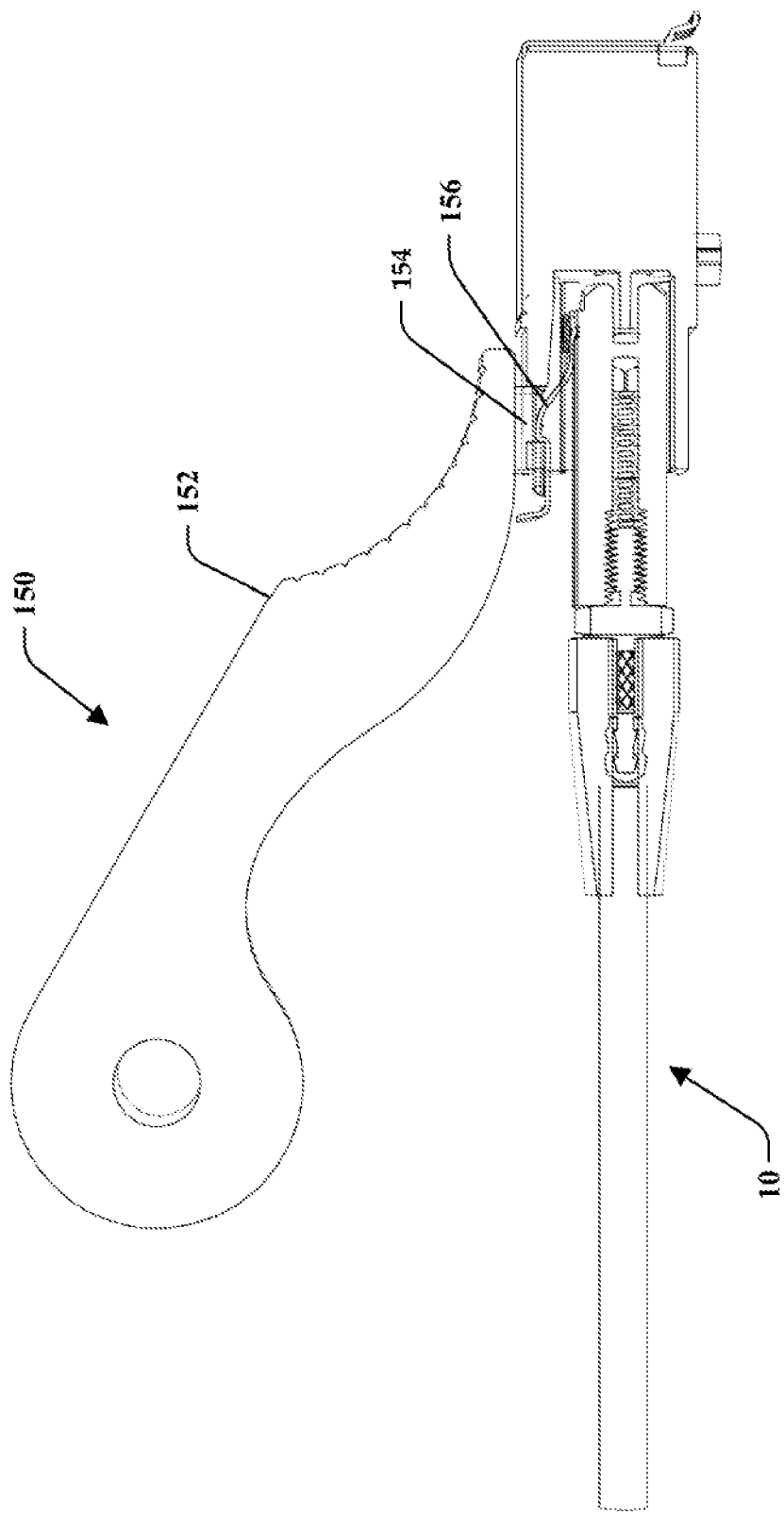

FIGS. 9 and 10 show a removal tool 150 contacting the locking member 22 when it is in the engaged position. The removal tool 150 includes a body 152, a first portion 154 extending downward from the body and configured to abut the raised portion 96 and the deflectable portion 82 at the second end 88, and a second portion 156 extending downward from the first portion 154 and configured to extend into the slot 84. The first portion 154 is sized to fit within the leg 122 as the tool is inserted into and removed from the receptacle 12.

Figure 11:
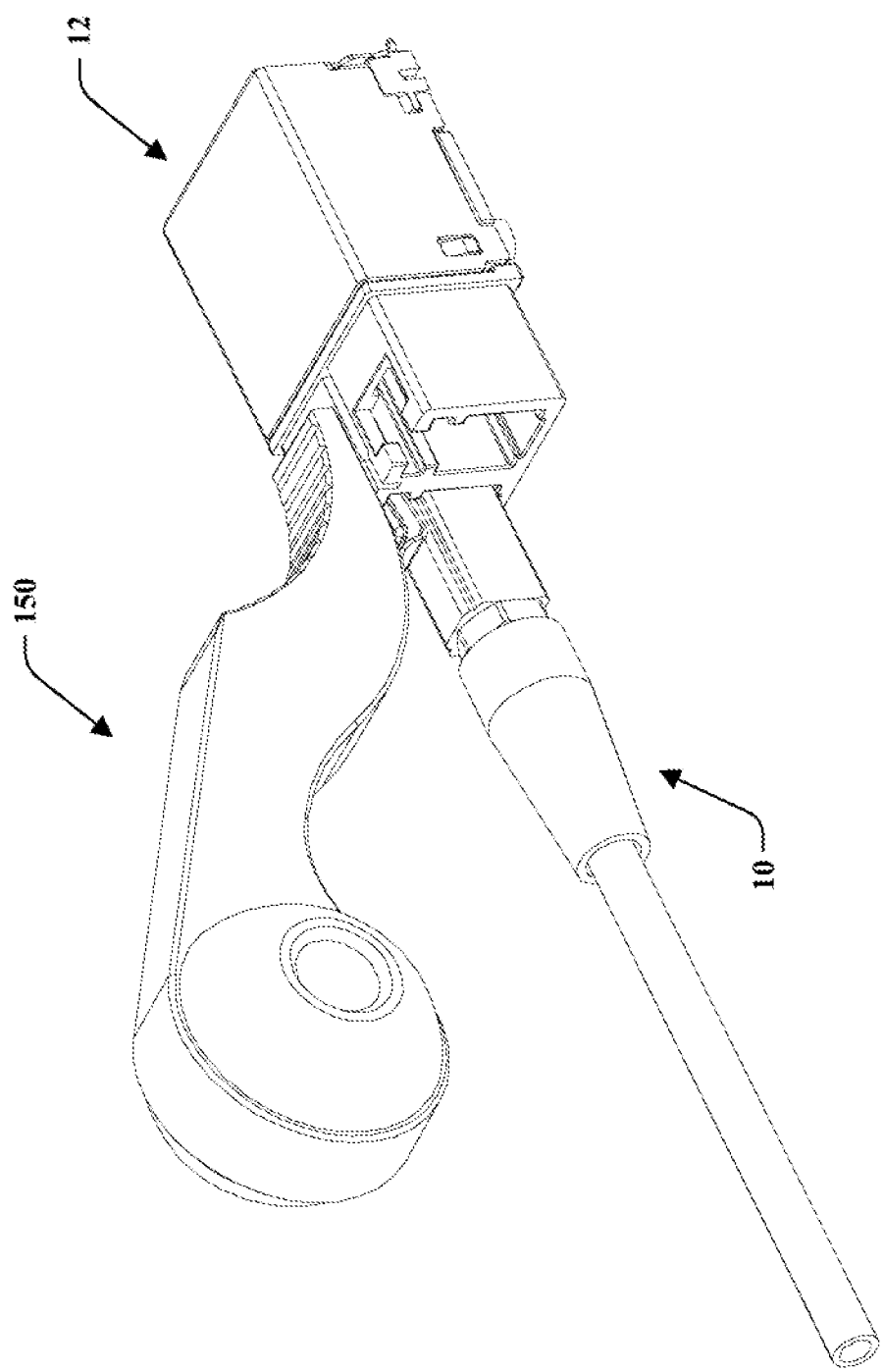
FIGS. 11 and 12 show the removal tool in a first removal position.
Figure 12:
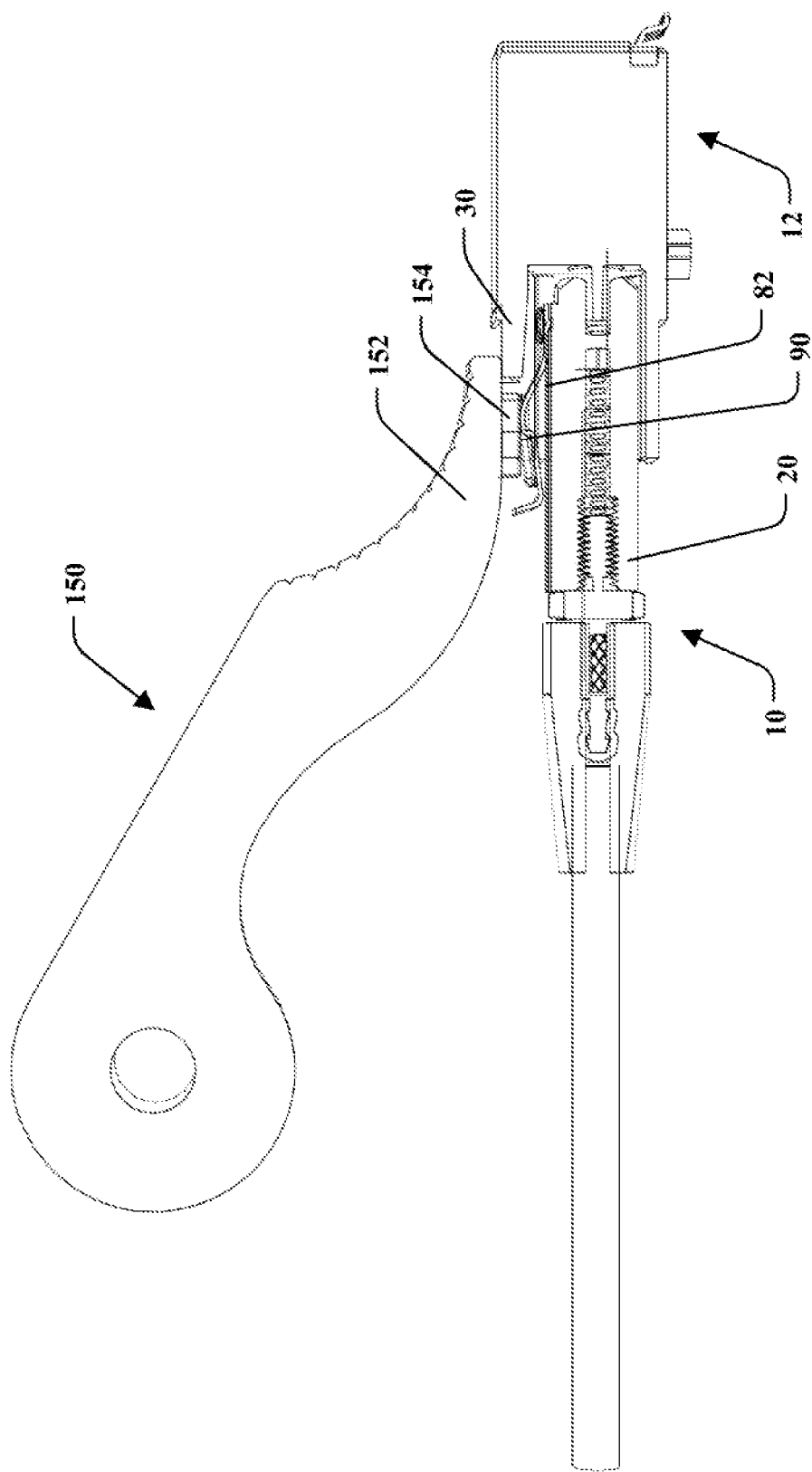

FIGS. 11 and 12 show the removal tool 150 is a first removal position where an underside of the body 152 is moved downward until it abuts the top of the housing 30, thereby causing the first portion 154 to move the deflectable portion 82 downward toward the body 20 to disengage the ledges 90 from the shoulder 44.

Figure 13:
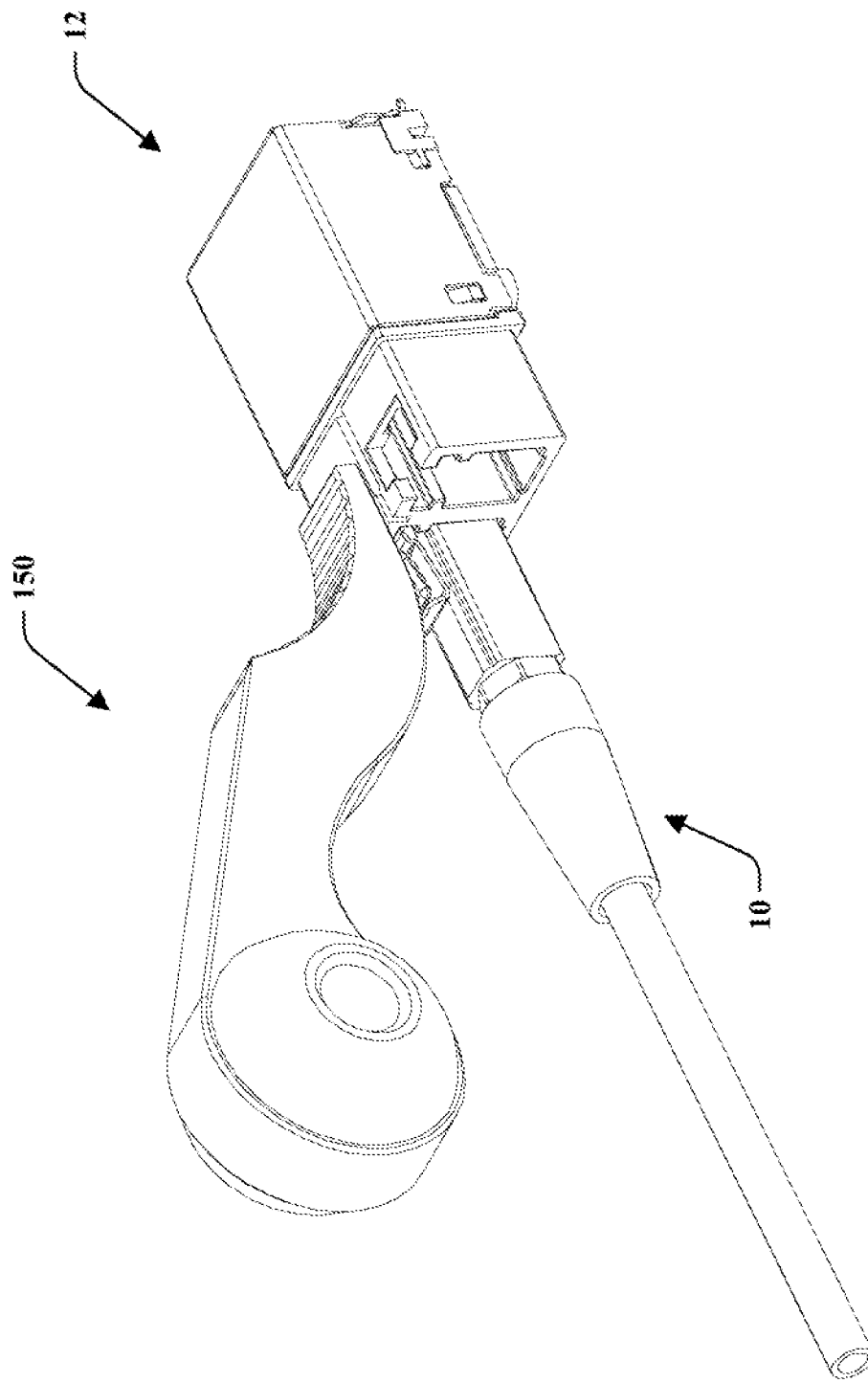
FIGS. 13 and 14 show the removal tool in a second removal position.
Figure 14:
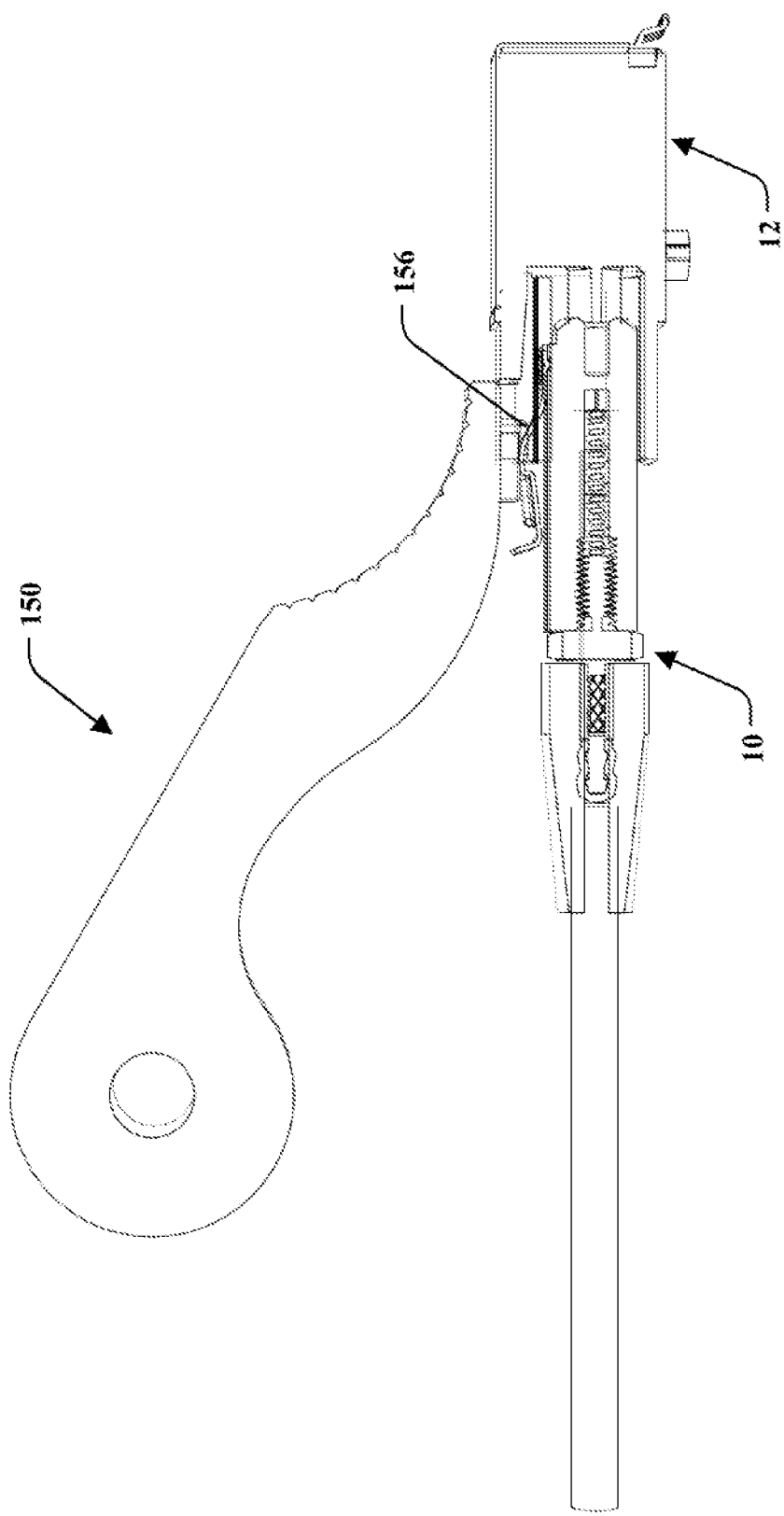

FIGS. 13 and 14 show the removal tool 150 in a second removal position where the connector 10 has been partially removed from the receptacle 12. When moved from the first removal position to the second removal position, the removal tool 150 moves in a direction opposite the forward direction, and the second portion 156 engages with a rearward portion of the slot 84 to move the connector 10.

Figure 15:
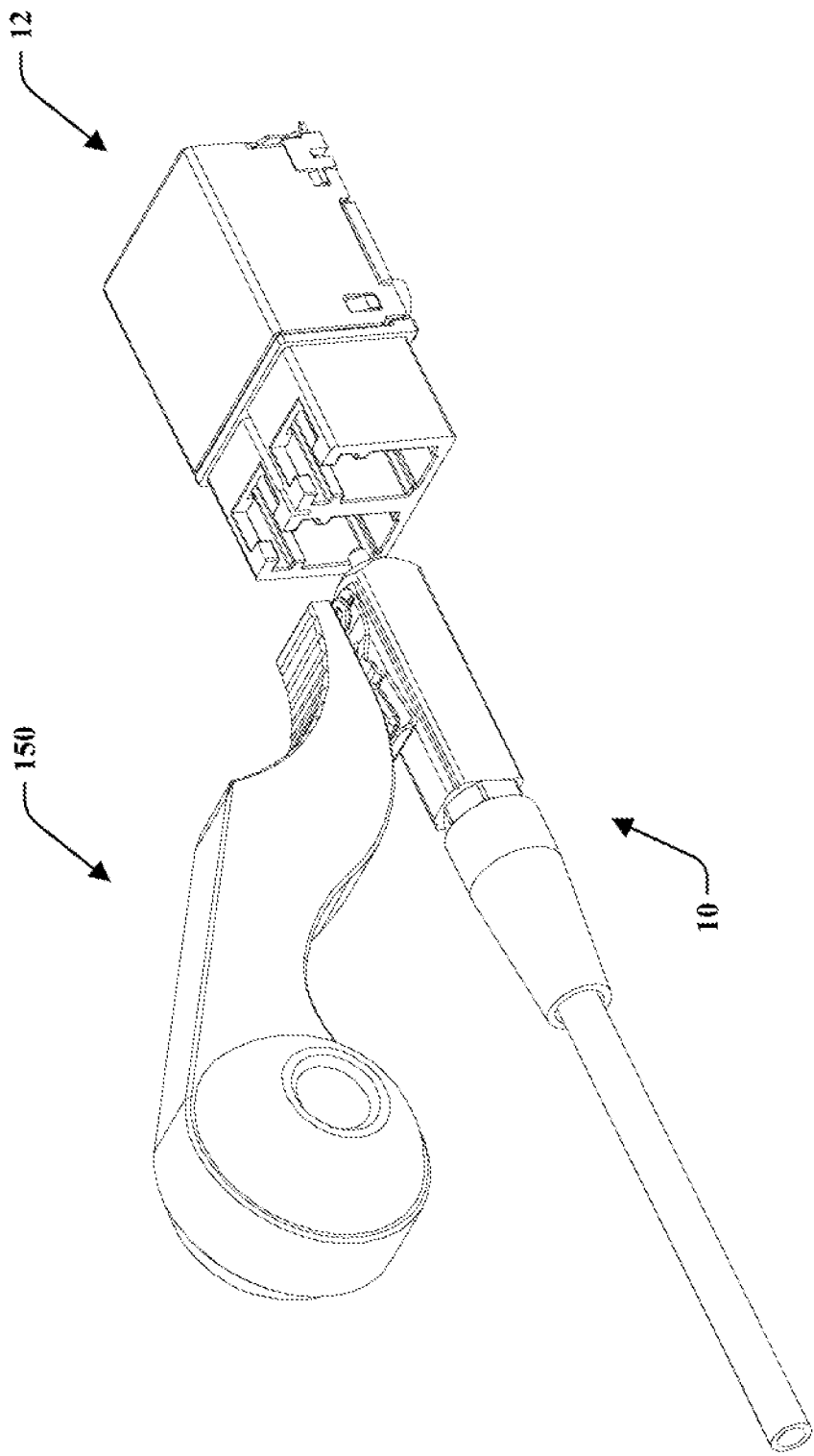
FIGS. 15 and 16 show the removal tool in a third removal position.
Figure 16:
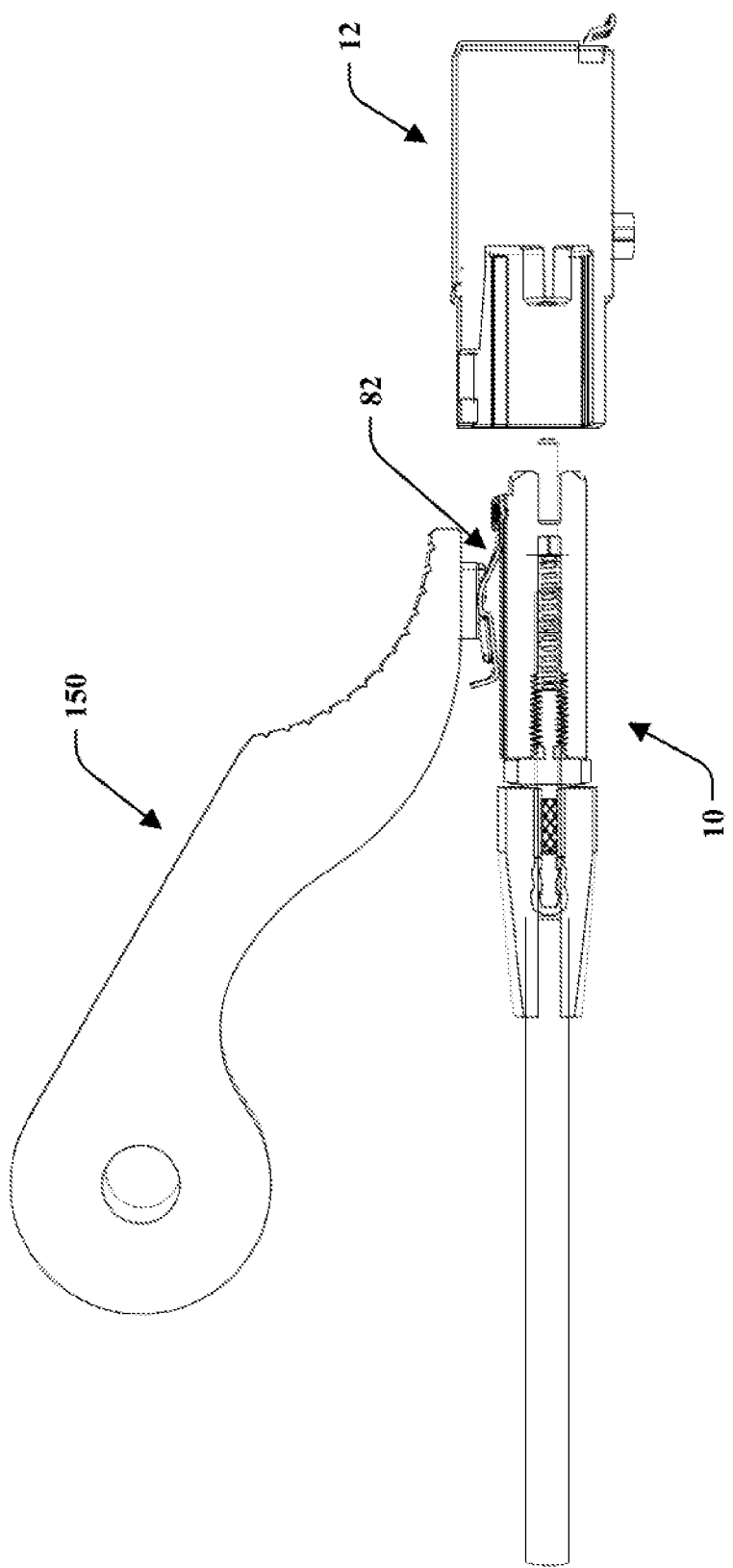
Figure 17:
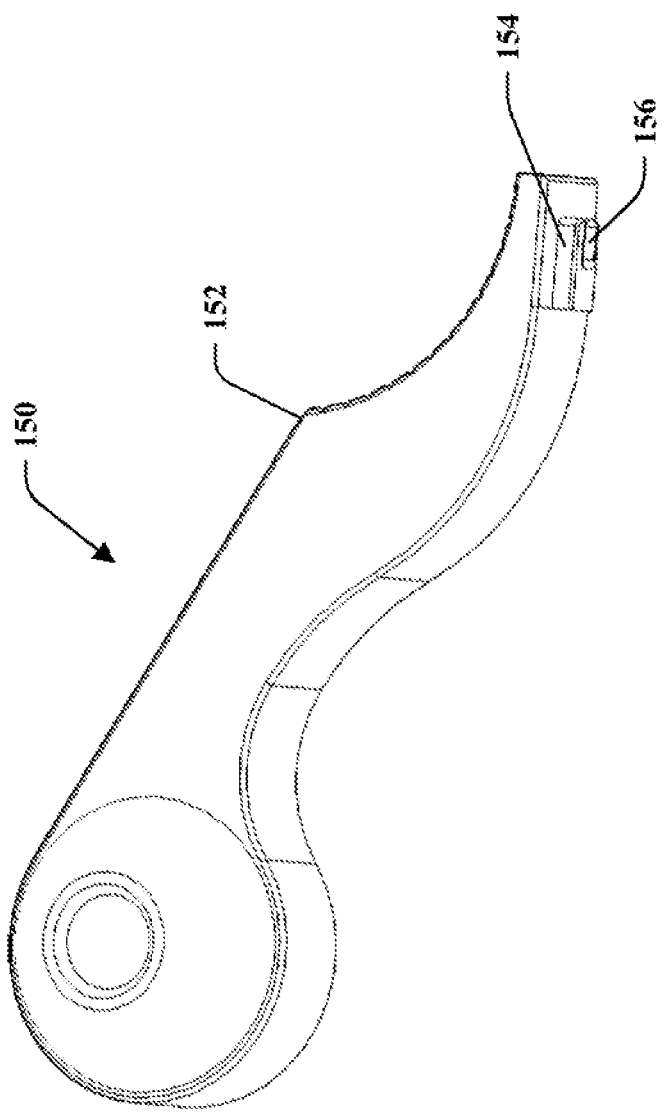
FIG. 17 is a perspective view of the removal tool.

FIGS. 15 and 16 show the removal tool 150 in a third removal position where the connector 10 has been completely removed from the receptacle 12 and the deflectable portion 82 is still deflected downward. The removal tool 150 can then be moved away from the connector 10.

Turning now to FIGS. 18-26, an exemplary assembly and disassembly process for a connector 210 and an LC receptacle 212 is shown. The connector 210 and LC receptacle 212 are substantially the same as the above-referenced connector 10 and LC receptacle 12, and consequently the same reference numerals but indexed by 200 are used to denote structures corresponding to similar structures in the connectors and receptacles. In addition, the foregoing description of the connector 10 and LC receptacle 12 is equally applicable to the connector 210 and LC receptacle 212 except as noted below. In particular, the LC receptacle 212 is a closed style receptacle where the housing 230 has a top portion 238 covering the shoulders 244.

Figure 18:
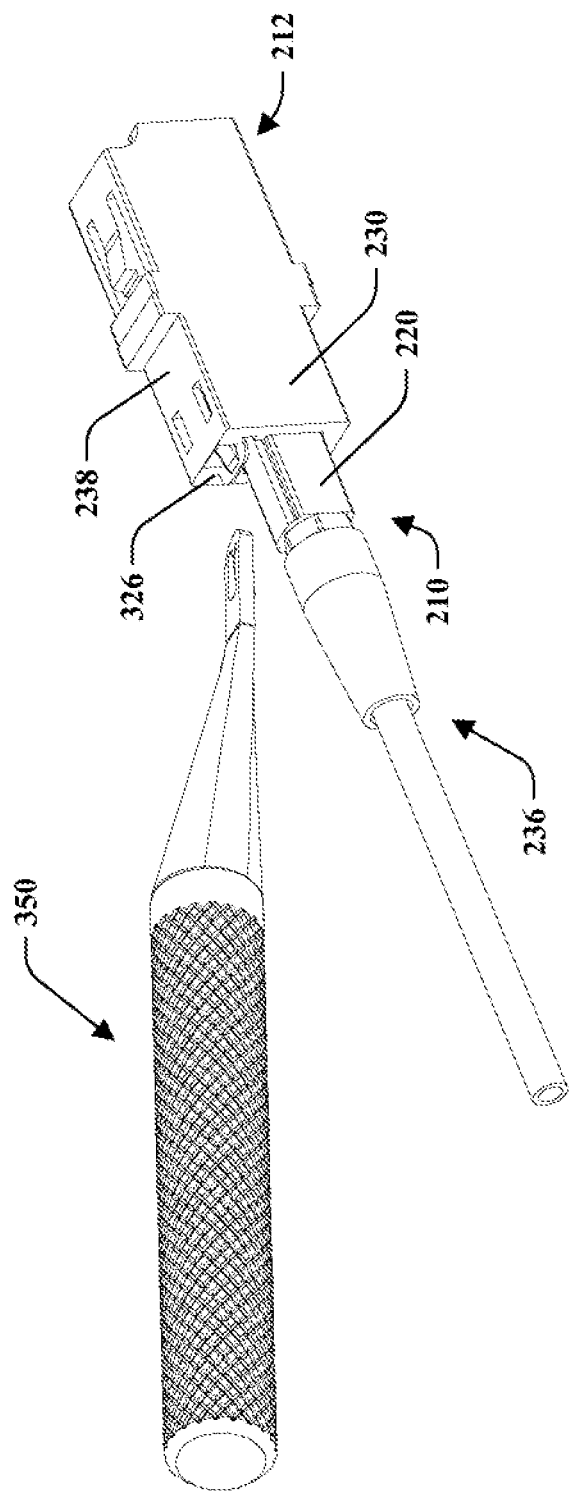
FIG. 18 is a perspective view of a fiber optic connector engaged with an LC receptacle.
Figure 20:
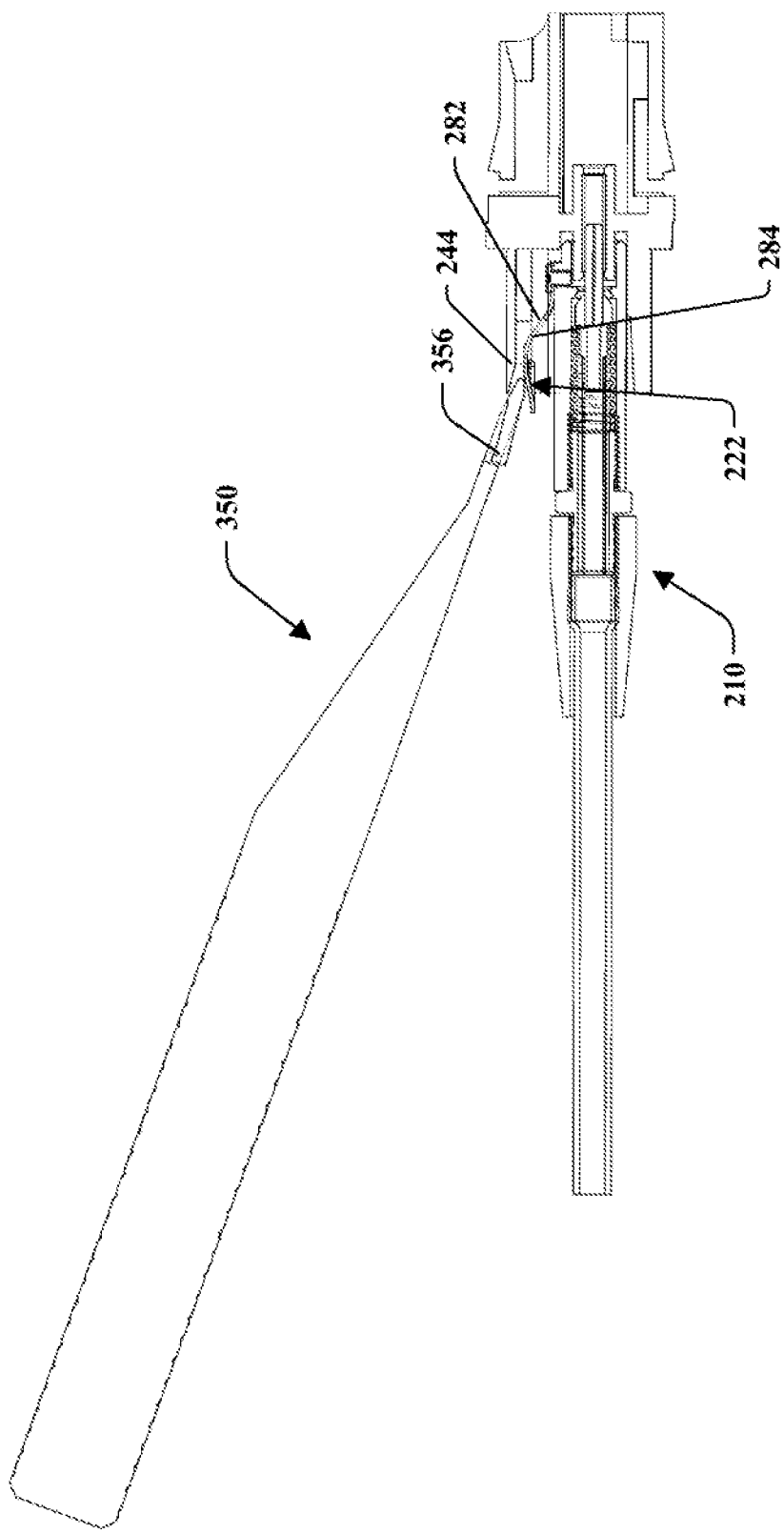

FIG. 18 shows the connector 210 in an engaged position engaged with the LC receptacle 212. To engage the connector 210, the housing 220 is advanced into the housing 230. As the housing 220 is advanced in the forward direction, the deflectable portion 282 (FIG. 25) contacts the portions 326 of the receptacle 212 and is deflected towards the housing 220. The housing 220 is advanced further until the deflectable portion 282 passes the leg and deflects upward into the head chamber where the ledges 290 (FIG. 25) engage with the shoulder 244 (FIG. 20). The fiber optic terminus is thereby interfaced with the optical component in the receptacle 12.

Figure 19:
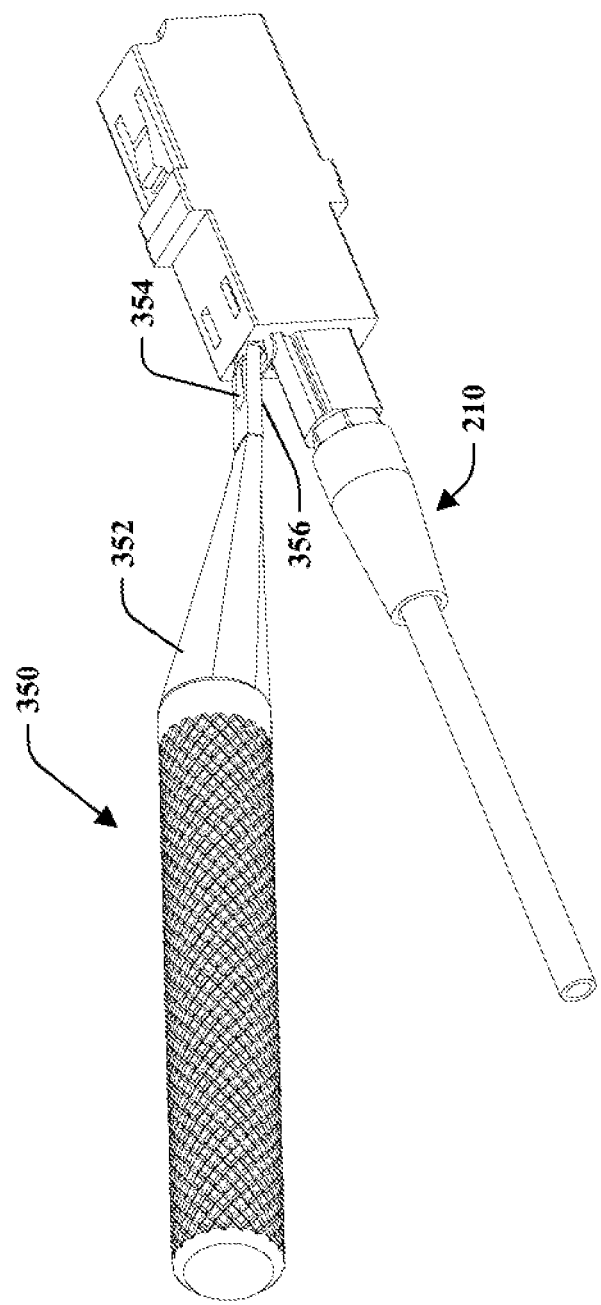
FIGS. 19 and 20 show the removal tool entering the LC receptacle.

FIGS. 19 and 20 show a removal tool 350 after it initially enters the opening 324 in the LC receptacle 212 when the locking member 222 is in the engaged position. The removal tool 350 includes a body 352, an open area 354 adjacent an end of the body, and a projection 356 projecting downward from the open area 354 below a bottom of the body 352. The projection 356 is configured to engage a rearward portion of the slot 284.

Figure 21:
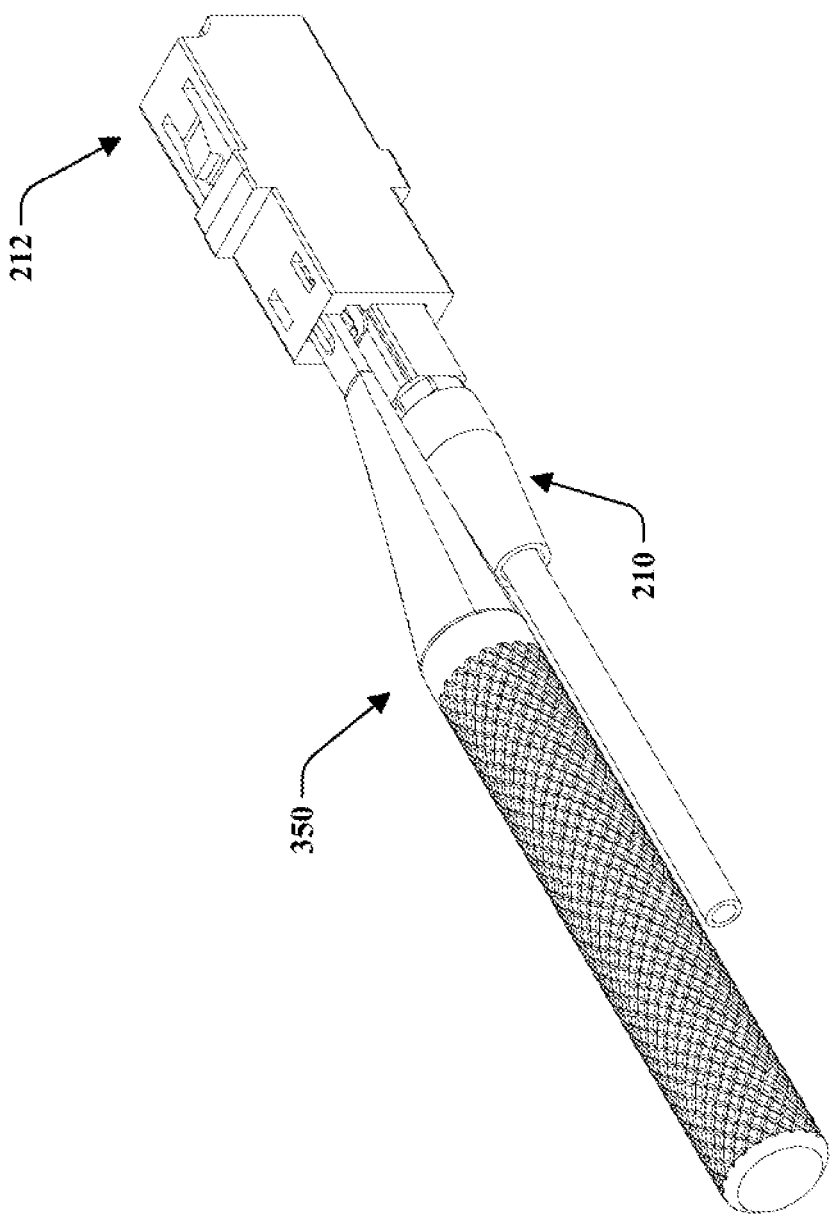
FIGS. 21 and 22 show the removal tool in a first removal position.
Figure 22:
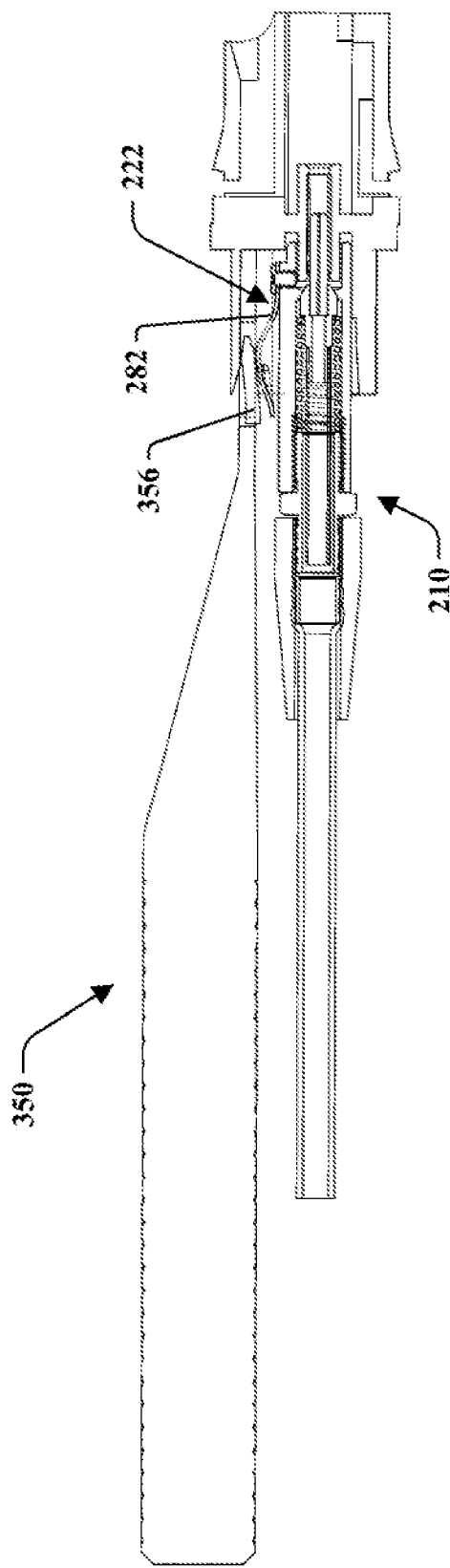

FIGS. 21 and 22 show the removal tool 350 is a first removal position where the tool is moved downward toward the connector 210 until the bottom of the removal tool 350 abuts the locking member 222 and deflects the deflectable portion 282 downward toward the body 20 to disengage the ledges 290 from the shoulder 244.

Figure 23:
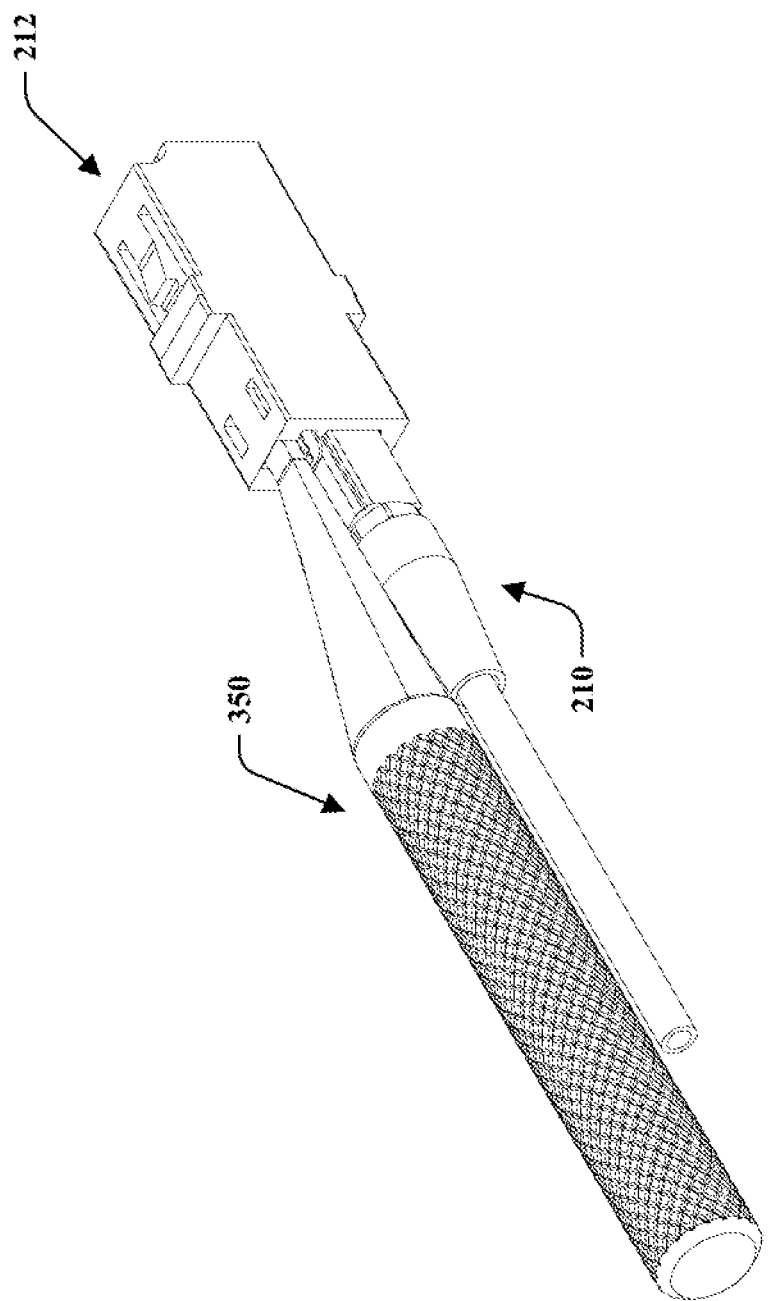
FIGS. 23 and 24 show the removal tool in a second removal position.
Figure 24:
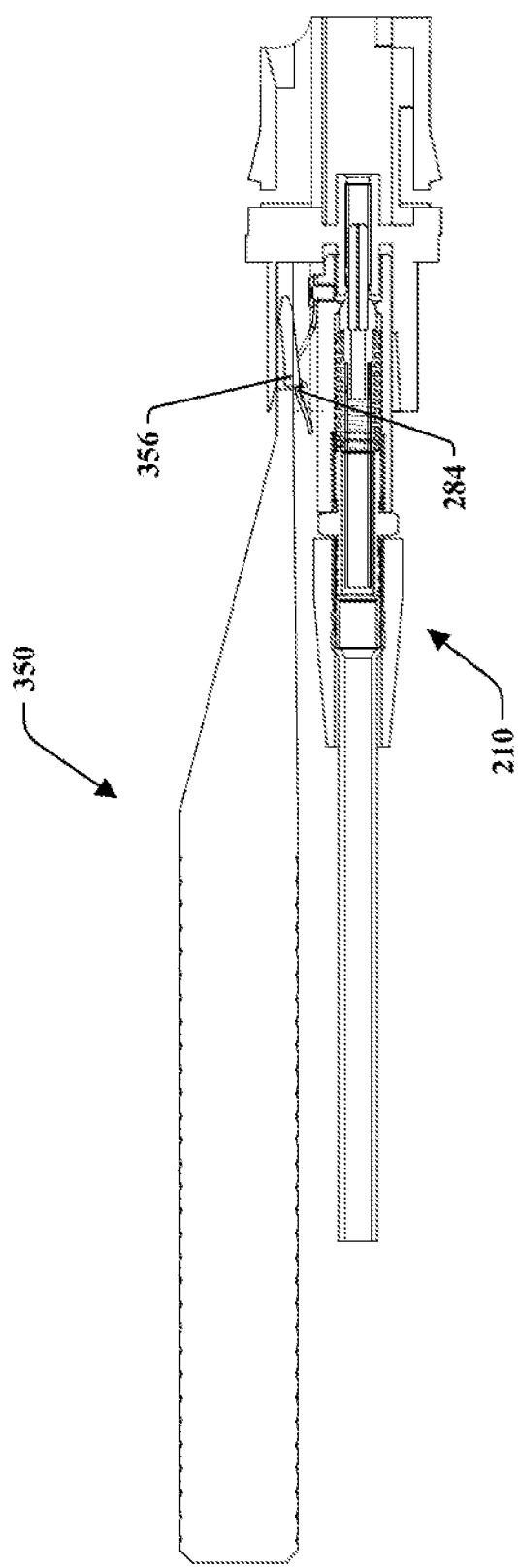

FIGS. 23 and 24 show the removal tool 350 in a second removal position where the removal tool has been moved in the forward direction until the end of the projection 356 engages the rearward portion of the slot 284.

Figure 25:
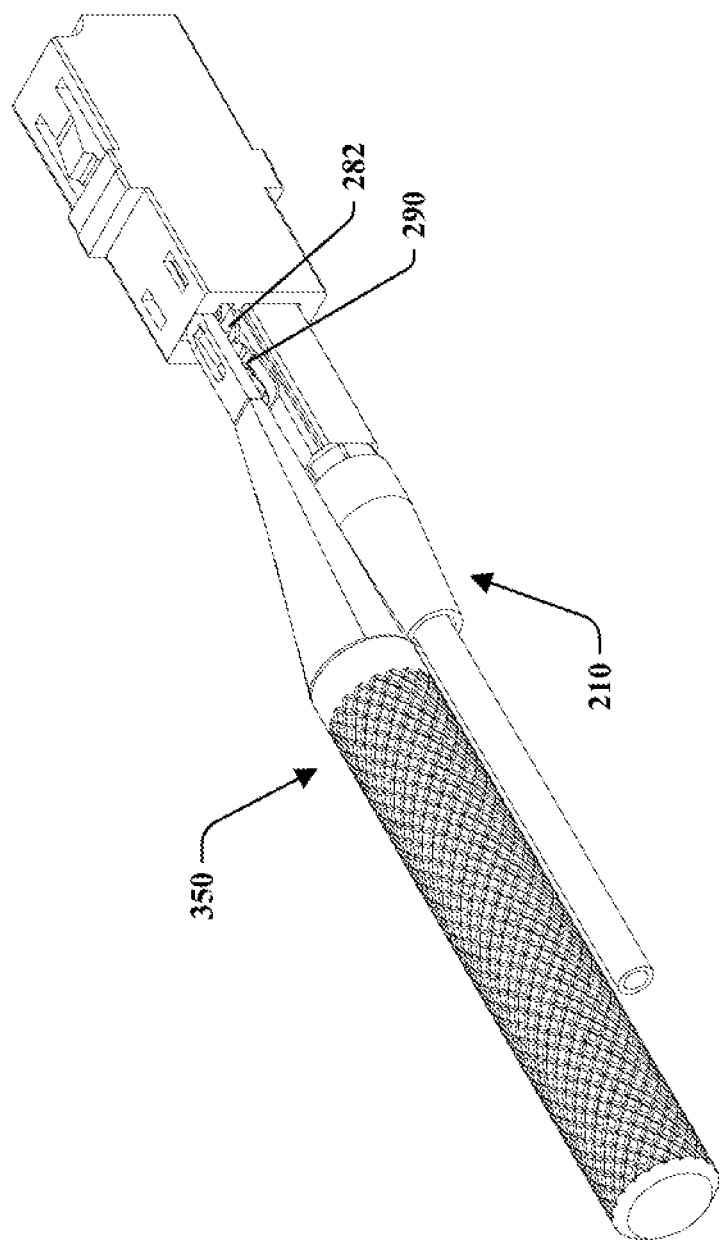
FIGS. 25 and 26 show the removal tool in a third removal position.
Figure 26:
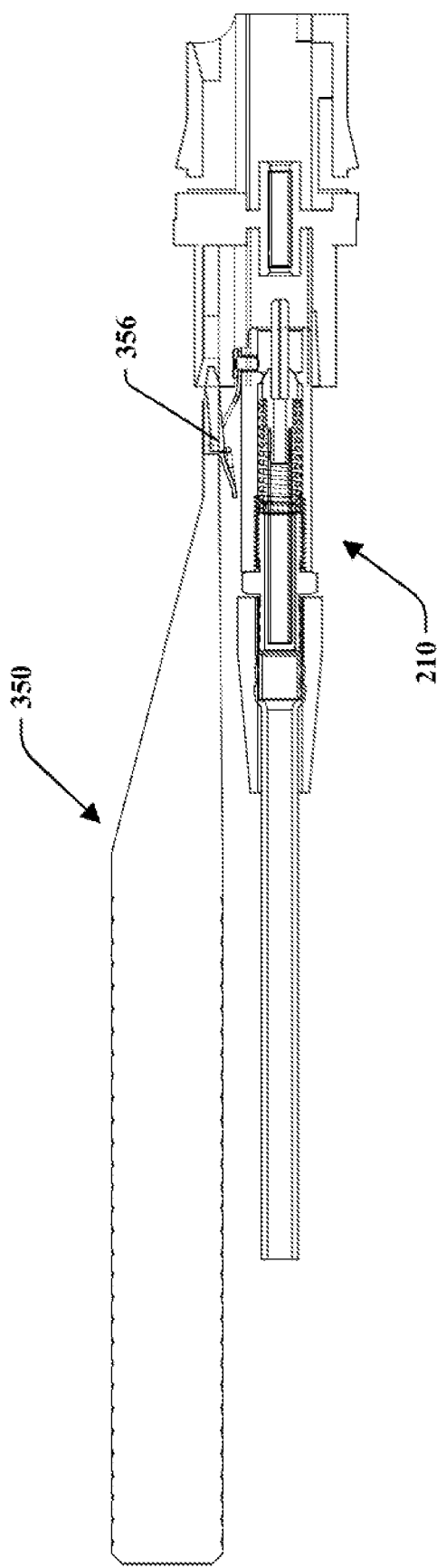

FIGS. 25 and 56 show the removal tool 350 in a third removal position where the connector 210 has been partially removed from the receptacle 212 and the deflectable portion 282 is still deflected downward. When moved from the second removal position to the third removal position, the removal tool 350 moves in a direction opposite the forward direction with the projection 356 engaged with the slot 84 to move the connector 210 out of the receptacle. The connector 210 can be further moved to a fourth removal position where the connector 210 is completely removed from the receptacle 212 and the removal tool 350 can then be moved away from the connector 210.

Additional aspects of the disclosure will be understood from the appended claims, which form part of this specification.

What is claimed is:

1. A fiber optic connector comprising:
   a housing sized to fit within a fiber optic receptacle and having a longitudinal passage for receiving a fiber optic terminus; and
   a deflectable locking member including a base attached to the housing, a deflectable portion having a first end extending from the base and a second end wider than the first end in a first direction orthogonal to the longitudinal passage, ledges extending downward from the second end of the deflectable portion toward the longitudinal passage for engaging with a wall of the fiber optic receptacle to prevent accidental separation of the housing from the receptacle, and a planar portion extending axially from the ledges and configured to abut an underside of a portion of the receptacle to prevent upward movement of the deflectable locking member when installed in the receptacle, the ledges and the planar portion being wider than the first end of the deflectable portion in the first direction.

2. The fiber optic connector according to claim 1, further including a securing member that secures the base of the locking member to the housing.

3. The fiber optic connector according to claim 2, wherein the securing member includes threads that mate with corresponding threads in an opening in the housing.

4. The fiber optic connector according to claim 1, wherein the deflectable portion includes a slot for engaging with a removal tool.

5. The fiber optic connector according to claim 1, wherein the deflectable portion deflects at a point adjacent the base.

6. The fiber optic connector according to claim 1, further including a flange extending upward from a back of the planar portion substantially orthogonal to the planar portion to provide an area for a user to engage during intentional removal of the connector.

7. The fiber optic connector according to claim 1, further including a raised portion extending upward from the planar portion proximate the second end of the deflectable portion between the ledges and extending rearward thereof for strengthening the locking member.

8. The fiber optic connector according to claim 1, wherein the deflectable locking member is biased in a first engaged position and deflectable downward toward the housing to a second disengaged position.

9. A fiber optic assembly including:
   a fiber optic receptacle having first and second ends, a longitudinal passage extending from the first end toward the second end, and a retaining notch in a top of the receptacle opening into the passage, the retaining notch having a head chamber with a rearward wall and a leg opening to the head chamber and the first end and having a width in a direction perpendicular to a direction of the longitudinal passage that is less than a width of the first chamber; and
   a fiber optic connector including:
      a housing sized to fit within the fiber optic receptacle and having a longitudinal passage for receiving a fiber optic terminus; and
      a deflectable locking member including a base attached to the housing, a deflectable portion having a first end extending from the base and a second end, ledges extending downward from the second end of the deflectable portion toward the longitudinal passage for engaging with the rearward wall, and a planar portion extending axially from the ledges for abutting an underside of inwardly extending portions of the receptacle that forms sides of the leg.

10. The fiber optic assembly according to claim 9, further including the inwardly extending portions, and wherein the rearward wall forms a rear portion of the head chamber proximal the leg.

11. The fiber optic assembly according to claim 10, wherein the planar portion is configured to abut the underside of the inwardly extending portions when the deflectable portion engages the rearward wall to prevent upward movement of the deflectable locking member when installed in the receptacle.

12. The fiber optic assembly according to claim 9, further including a securing member that secures the base of the locking member to the housing.

13. The fiber optic assembly according to claim 12, wherein the securing member includes threads that mate with corresponding threads in an opening in the housing.

14. The fiber optic assembly according to claim 9, wherein the deflectable portion includes a slot for engaging with a removal tool.

15. The fiber optic assembly according to claim 9, wherein the deflectable portion deflects at a point adjacent the base.

16. The fiber optic assembly according to claim 9, further including a flange extending upward from a back of the planar portion substantially orthogonal to the planar portion to provide an area for a user to engage during intentional removal of the connector.

17. The fiber optic assembly according to claim 16, further including a raised portion extending upward from the planar portion and rearward of the second end of the deflectable portion for strengthening the locking member.

18. The fiber optic assembly according to claim 9, wherein the deflectable locking member is biased in a first engaged position and deflectable downward toward the housing to a second disengaged position.

19. A fiber optic connector comprising:
   a housing sized to fit within a fiber optic receptacle and having a longitudinal passage for receiving a fiber optic terminus; and
   a deflectable locking member including a base attached to the housing, a deflectable portion having a first end extending from the base and a second end, ledges extending downward from the second end of the deflectable portion toward the longitudinal passage for engaging with a wall of the fiber optic receptacle, a planar portion extending axially from a bottom of the ledges for abutting an underside of the fiber optic receptacle, and a raised portion extending upward from the bottom of the ledges and the planar portion.

* * * * *